(No Model.) 2 Sheets—Sheet 1.
J. T. QUEALY.
MONOCYCLE.
No. 473,959. Patented May 3, 1892.
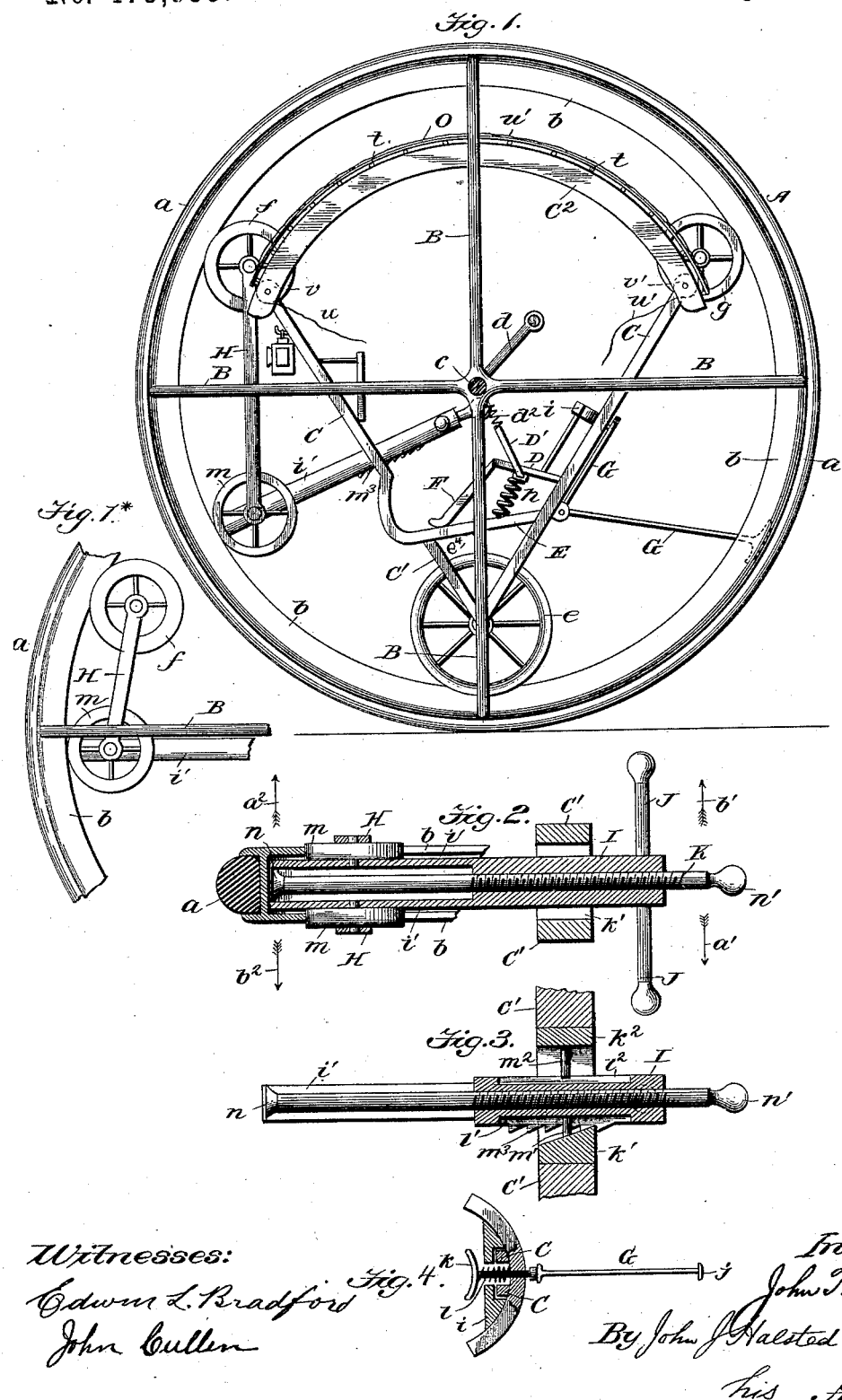
Witnesses:
Edwin L. Bradford
John Cullen
Inventor:
John T. Quealy
By John J. Halsted & Son.
his Attorneys (No Model.) 2 Sheets—Sheet 2.
J. T. QUEALY.
MONOCYCLE.
No. 473,959. Patented May 3, 1892.
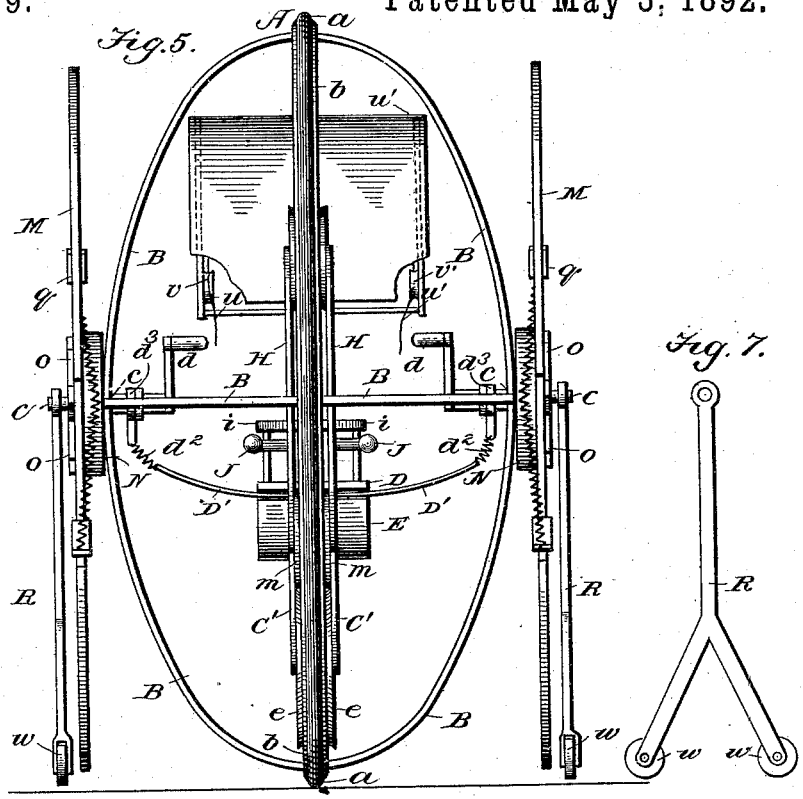
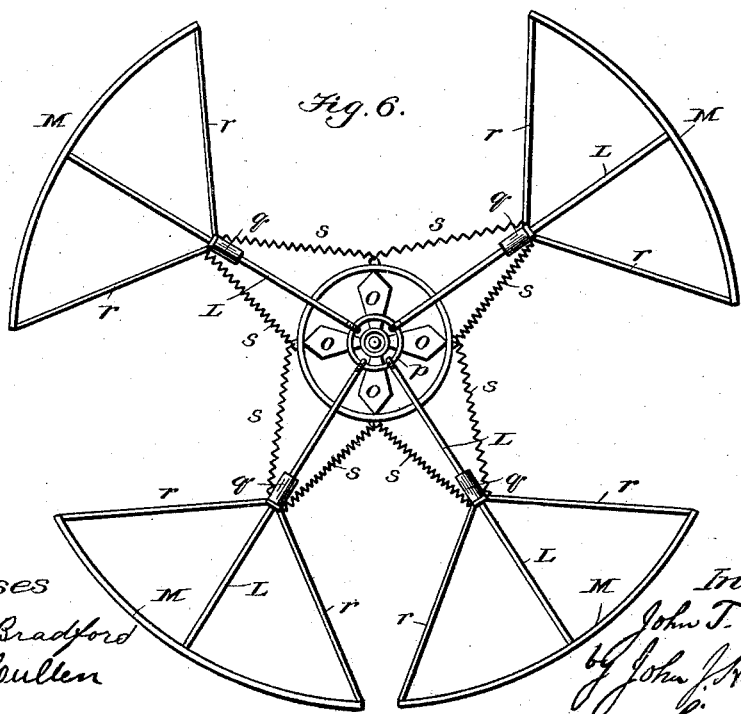
Witnesses
Edwin L. Bradford
John Cullen
Inventor
John T. Quealy
by John J. Halstead & Son
his Attorneys

UNITED STATES PATENT OFFICE.

JOHN T. QUEALY, OF SOUTH COVENTRY, CONNECTICUT.

MONOCYCLE.

SPECIFICATION forming part of Letters Patent No. 473,959, dated May 3, 1892.

Application filed November 30, 1891. Serial No. 413,580. (No model.)

*To all whom it may concern:*

Be it known that I, JOHN T. QUEALY, of South Coventry, in the county of Tolland and State of Connecticut, have invented certain new and useful Improvements in Monocycles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of velocipedes which have only one traction-wheel and which are usually known by the name of "monocycles."

My invention consists generally of a large traction-wheel, within which is a frame supported upon rollers which rest upon and are adapted to rotate on a circular track or tracks extending inward from the rim of the wheel, and said frame supporting the rider's seat and the steering and brake mechanism.

My improvements also consist in providing the large traction-wheel with two sets of spokes or braces which arch or bow outward from each other and meet at their hubs, which are opposite the center of the wheel, and secured to and extending inward from said hubs cranks by which the rider turns the wheel.

My improvements also consist in certain features and details of construction, as more particularly hereinafter described.

In the accompanying drawings, Figure 1 illustrates a side elevation of my improved monocycle with the balancing mechanism removed; Fig. 1*, a detail showing roller $m$ in a more elevated position. Figs. 2 and 3 are sectional details, enlarged, of the steering mechanism. Fig. 4 is an enlarged detail of the rear brake and its connections. Fig. 5 is a front view of my improved monocycle. Fig. 6 is a side elevation of the balancing mechanism. Fig. 7 is a detail of an adjunct steering mechanism.

Similar letters represent like parts in all the figures.

A is the large single traction-wheel, within the circumference of which the rider is adapted to sit and to propel the wheel. The perimeter or rim of the wheel A is provided with the usual rubber tire $a$ as now used upon bicycles, and extending inwardly from the wheel-rim are two circular flanges $b\ b$—one on either side of said rim. These flanges $b\ b$ form a double track on which rest and ride the guiding and supporting wheels of the frame which supports the driver's seat, &c.

B B are two sets of spokes or braces, which extend outward from either side of the rim of the wheel A and which bow or arch outward, each set of spokes meeting at a common center or hub $c$. Extending inward from said hubs are hand-cranks $d\ d$, by which the monocycle is adapted to be propelled.

C C' C² is a frame of somewhat triangular form, having journaled at each angle of the same the three sets of grooved wheels $e, f$, and $g$, which engage with the circular flanges $b\ b$ and ride upon the same, or rather, to be more accurate, upon which wheels the flanges $b\ b$ are adapted to ride. The wheels $e\ e$ are larger than the wheels $f f$ and $g\ g$ and form the support for the frame C C' C², while said wheels $f f$ and $g\ g$ are only guiding-wheels for retaining the frame in its proper position within the wheel A.

D is the seat or chair for the rider, which is supported by the upright C between the two parallel bars of the same below the hubs $c$ and above the cranks $d\ d$. This chair or seat has a yielding property controlled by a spring $h$, which is inclosed between the seat and a cross foot-rest E. Said foot-rest slopes somewhat from rear to front and extends between the uprights C and C' of the frame, and an inclined and curved brace F, extending from the front of the seat D and with its curved lower end resting on the rest E, serves, with the spring $h$, to support the seat, and by sliding down upon said rest to allow the seat D to yield with the rider's weight. The crosspiece $i$ of the back of the chair D is made double, so as to span the upright C of the frame and to allow said back and seat to slide upon said upright.

The seat D is further supported and braced by a yielding spring-bar D', which passes through an eye $e^4$, extending from the under side of said seat, and which bar is connected at each end by a coil-spring $d^2$ to a ring $d^3$, which rings are loosely hung upon the inner extensions of the hubs $c\ c$.

G is an elbow-lever pivoted at its elbow to the upright C near the foot-rest E. The outer end of this lever is provided with a pad $j$, which is inclosed between the two flanges $b\ b$ of the traction-wheel A and adapted to press upon the inner rim of said wheel when it is desired to brake the same. The inner and upper end of the lever G is bent forward, extending between the two parallel bars which form the upright C and through a slot in the chair-back $i$, where it terminates in a cross-piece $k$. The brake G is to be operated by the rider leaning back upon the cross-piece $k$, and thus lowering or depressing the outer arm of said lever and the pad or brake $j$ against the inner rim of the wheel A. When the pressure on the cross-piece $k$ is removed, a coil-spring $l$, surrounding the forward bent portion of the lever G and bearing against the cross-piece $k$, will force the latter forward, and thus relieve the pressure of the brake upon the wheel.

H H are two parallel bars or arms loosely suspended near one end to the journals of the wheels $f$ at the upper end of the upright C'.

I is a tube having an internal screw-thread and provided with two parallel prongs or extensions $i'\ i'$. The tube I passes between the two bars of the uprights C' and rests upon a cross-piece $k'$, and another cross-piece $k^2$ between said bars is situated a short distance above the tube I. (See Fig. 3.) The uprights of C' are far enough apart at this place (see Fig. 2) to allow a slight lateral play of the tube I between said bars. Journaled to the prongs $i'\ i'$ and to the lower portion of the swinging arms H are two rollers $m\ m$, having smooth peripheries and adapted to ride over the circular flanges or tracks $b\ b$, the positions of said rollers upon the prongs $i'\ i'$ being such that when said rollers engage with the tracks $b\ b$ the ends of the prongs $i'\ i'$ are between said tracks and almost touching the inner rim of the wheel A. On the under part of the tube I is a longitudinal groove $l'$, and immediately over it, on the upper portion of said tube, is a similar groove $l^2$. Two vertical pins $m'\ m^2$, extending, respectively, from the cross-pieces $k'$ and $k^2$, are adapted to engage with said grooves and serve as a fulcrum or pivots on which to turn the tube I and also with said grooves to allow the tube I to be moved longitudinally. The lower portion of the tube I to one side of the groove $l'$ is provided with teeth $m^3$, which are adapted to engage with the back upper edge of the cross-piece $k'$ and by which means the tube I can be locked from forward longitudinal movement. The free ends of the pins $m'\ m^2$ should be sufficiently far apart to allow of the slight rise the tube I would have to sustain in its longitudinal movement from tooth to tooth. (See Fig. 2.)

J are two cross-bars, forming handles by which the tube I may be swung on the pins $m'\ m^2$ from right to left or moved longitudinally.

K is a threaded rod passing through the tube I and between the prongs $i'\ i'$ and its thread engaging with the internal thread of said tube. This rod K is longer than the tube I and its prongs $i'$ combined, and is provided on the end nearest said prongs with a pad $n$ and on its opposite and free end with a milled head $n'$ or other handle. This rod K, with its pad $n$, serves as a brake for the wheel A when the rider screws in said rod, so that the pad $n$ will bear against the inner rim of the wheel A.

The two prongs $i'\ i'$ serve as a means for guiding the wheel A by turning the tube I and its prongs $i'\ i'$ either to the right or left by means of the handles J J. When said tubes and prongs are in their extremest forward positions, the wheels $m$ will be bearing upon the tracks $b$ and the ends of the prongs $i'\ i'$ will be between said tracks, nearly touching the same and also nearly touching the inner rim of the wheel A, as shown in Fig. 2. If now the handles J be swung in the direction of the arrow $a'$ on the pivots $m'\ m^2$, the prongs $i'\ i'$ will swing in the direction of the arrow $a^2$ and with the prong nearest said arrow, or the right one, bearing against the wall of the right track $b$, and if at the same time the rider leans a little to the right the pressure will be on the right portion of the bar D', the wheel A will be slightly tipped in the same direction, the front portion of the wheel A will be turned to the right, and the machine will steered in this direction.

If the handles J be swung in the direction of the arrow $b'$, the outer ends of the prongs $i'\ i'$ will swing in the direction of the arrow $b^2$, and if the rider leans a little to the left the reverse of the action stated above will be given and the wheel A will be guided to the left. The wheels $m$ serve to assist the action of the prongs in guiding the wheel A. When the steering apparatus is not needed for use, the entire mechanism can be drawn back from engagement with the tracks of the wheel A and locked, as above described.

Either or both of the brakes G and K may be used when desired; but when going downhill the front brake K is particularly applicable, as it may be screwed up to operate, and the rider's hands are then free to guide the machine or for any other purpose required.

Extending at right angles from the outside of each of the hubs $c\ c$ are four radial blocks $o$, which, with the hubs as the center, form a Maltese cross, and passing through these blocks $o$ and around the hub $c$ is a ring $p$.

L L L L are four jointed rods, each of which is connected loosely at one end to the ring $p$ and between the blocks o by eyes. The two sections of each of the rods L are connected by a tubular internally-threaded coupling q, in order that the length of said rods may be regulated.

The rods L, which should not be quite so long as the radii of the wheel A, have secured to their outer ends sectors M, which are securely held upon said arm by braces r, connecting the ends of said sectors with the arm to which each is attached. (See Fig. 5.)

During the revolution of the machine and the large wheel A the four arms L and their sectors M act as balances to the machine to keep the wheel A in a substantially vertical position and also to prevent said wheel and machine from toppling over sidewise, as a slight inclination of the wheel A to either side will cause one of the sectors M to come in contact with the ground and allow the machine to rest upon the same. The arms L and their sectors M have a play between the blocks o, and when said arms by the revolution of the wheel A get beyond their centers of gravity they will fall, and by the impetus attained thereby will assist the rotation of said wheel.

N is a ring surrounding the blocks o and connecting their outer ends and which serve as a brace to said blocks and also as a lateral rest and guide for the arms L. Coil-springs s, secured at one end to each side of the arms L and at the other end to the ring N, opposite the outer ends of the blocks o, serve to resist somewhat the fall of the arms L and to prevent their striking the blocks o in their fall, and thus jarring and injuring the machine.

The upper portion $C^2$ of the triangular frame is arched and extends laterally outward on either side of the uprights C C', and resting on top of said part $C^2$ is a flexible sun screen or shade O, provided at intervals with cross-bars t. A string u, connected to the front end of the screen O and passing over a pulley v, journaled at the front end of the brace $C^2$, serves as a means to spread out said screen by pulling said string, while another string u', also connected with the front end of the same and over a pulley journaled to the rear of the brace C, serves as a means, by pulling said string, of folding up and drawing back said screen out of use.

R R are two dependent arms loosely hung upon outward extensions of the hubs c c, said arms being provided at their lower ends with rollers w, and said arms being of such length that when the wheel A is in a vertical position the rollers w w will be within a short distance of the ground. The object of these arms R R, with their rollers w w, is to assist in steering the machine, the operation being the following: When the rider leans a trifle to the right or left, in order to steer as above described, the rollers w on the side that the rider leans will come in contact with the ground and will give a fulcrum on which the wheel A may turn in said direction.

S is a mirror, which is secured to the uprights C' and by which the rider can see what is behind him. (See Fig. 1.)

T is a hook secured to the uprights C' above the mirror S and on which a lantern V is suspended.

What I claim as my invention, and desire to secure by Letters Patent, is—

1. In a monocycle, the combination of the large traction-wheel having the arched braces or spokes B meeting at two concentric hubs c, a frame inclosed within said traction-wheel and supporting rollers which engage and run upon the inner circumference of said wheel, a rider's seat also supported upon said frame, and means attached to said large traction-wheel for rotating it directly without intermediate mechanism, all as set forth.

2. In a monocycle, the large traction-wheel having the arched braces or spokes B meeting at two concentric hubs c and crank-handles secured to said hubs and extending inward from the same, a frame inclosed within the traction-wheel and supporting rollers which engage and run upon the inner circumference of said wheel, and a rider's seat also supported upon said frame below the crank-handles in a position to be operated by the rider, all as set forth.

3. In combination with the wheel A, having the flanges b b, the frame supporting the rollers which engage with and run upon said flanges, the rider's seat supported on said frame above the lower rollers, and the brake G, pivoted to the upright C of said frame and having its outer end and brake-pad inclosed between the flanges b b and its inner or upper end curved inward and over the rider's seat, all as and for the purposes described.

4. In combination with the wheel A, having the flanges b b, a frame inclosed within said wheel and supporting rollers which engage with and run on said flanges, and the tube I, supported upon the upright C' of said frame, whereby said tube may be permitted a slightly-lateral swinging movement and a longitudinal movement, the outer end of said tube being inclosed between the flanges b b and said tube being pivotally supported near said outer end by a hanger or link which is loosely pivoted to said frame, all as and for the purposes set forth.

5. In combination with the wheel A, having the arched spokes or braces B and the hubs c c, the seat D, and the springing and yielding brace D', extending under said seat and attached at each end to the inner extensions of the hubs c by loose rings, all as and for the purposes set forth.

6. In combination with the wheel A, having the flanges b b, a frame inclosed within said wheel and supporting rollers which engage with and run on said flanges, the tube I, supported upon the upright C' of said frame, whereby said tube may be permitted a slightly-lateral swinging movement and a longitudinal movement, a swinging hanger loosely pivoted at one end to said frame, and rollers $m$ for engagement with the flanges $b\,b$, journaled to the lower portion of the said hanger and also to the sides of the tube I and at positions upon said tube that will enable the outer or forward ends of the tube to be inclosed between the flanges $b\,b$ and to almost touch the inner rim of the wheel A when said rollers $m$ are in contact with said flanges, all as set forth.

7. In combination with the wheel A, having the flanges $b\,b$, the tube I, having an internal screw-thread and supported upon the inclosed frame, as described, and the outwardly-threaded brake-rod K, passing through the tube I and provided on its forward end with a pad for entering between the flanges $b\,b$ and for pressure against the inner rim of said wheel, all as set forth.

8. In combination with the wheel A, having the flanges $b\,b$, the tube I, supported upon a horizontal cross-bar of the inclosed frame, as described, and having the notches $m$ on the under part of said tube for engagement with the rear edge of said cross-bar, all as and for the purposes set forth.

9. In combination with the large traction-wheel, its arched spokes or braces and hubs $c$, the blocks $o$, ring $p$, arms L, and sectors M, all arranged and adapted to operate in the manner described.

10. In combination with the large traction-wheel, its arched spokes or braces and hubs $c$, the blocks $o$, ring N, ring $p$, arms L, and sectors M, all arranged and adapted to operate in the manner described.

11. In combination with the large traction-wheel, the frame C C' $C^2$, supporting rollers which engage with and are adapted to run on the inner circumference of said wheel, a flexible screen supported on the arched part $C^2$ of the frame, and means for extending the same over said part and for gathering said screen at one end of said part from near the center of said wheel, all as set forth.

JOHN T. QUEALY.

Witnesses:
F. E. WILLIAMS,
F. R. WILLIAMS.